United States Patent [19]

Law et al.

[11] Patent Number: 4,833,052
[45] Date of Patent: May 23, 1989

[54] BISAZO PHOTOCONDUCTIVE IMAGING MEMBERS

[75] Inventors: Kock-Yee Law, Fairport; Ihor W. Tarnawskyj, Rochester, both of N.Y.

[73] Assignee: Xerox Corporation, Stamford, Conn.

[21] Appl. No.: 227,395

[22] Filed: Aug. 2, 1988

[51] Int. Cl.$^4$ .............................................. G03G 5/06
[52] U.S. Cl. ....................................... 430/58; 430/73; 430/79
[58] Field of Search ......................... 430/58, 59, 73, 79

[56] References Cited

U.S. PATENT DOCUMENTS

| | | | |
|---|---|---|---|
| 3,996,049 | 12/1976 | Rochlitz | 96/1.5 |
| 4,307,167 | 12/1981 | Bowden et al. | 430/58 |
| 4,440,845 | 4/1984 | Hashimoto | 430/57 |
| 4,486,519 | 12/1984 | Sasaki | 430/58 |
| 4,486,522 | 12/1984 | Hashimoto | 430/79 |
| 4,537,844 | 8/1985 | Hashimoto | 430/58 |
| 4,555,567 | 11/1985 | Hashimoto | 534/654 |
| 4,596,754 | 6/1986 | Tsutsui et al. | 430/58 |
| 4,713,307 | 12/1987 | Law et al. | 430/57 |

Primary Examiner—John L. Goodrow
Attorney, Agent, or Firm—E. O. Palazzo

[57] ABSTRACT

A photoconductive imaging member comprised of a supporting substrate; a photogenerating layer comprised of a bisazo compound of the formula

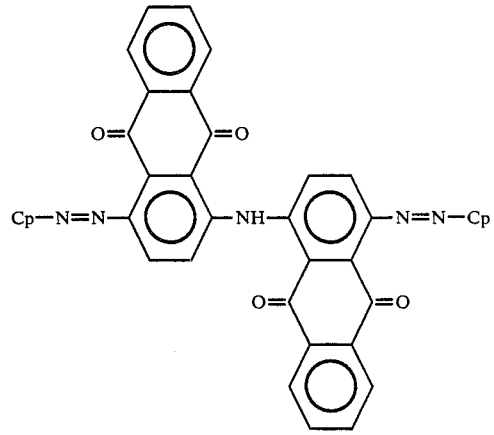

wherein Cp is an azoic coupler selected from the group consisting of (Abstract continued on next page.)

-continued
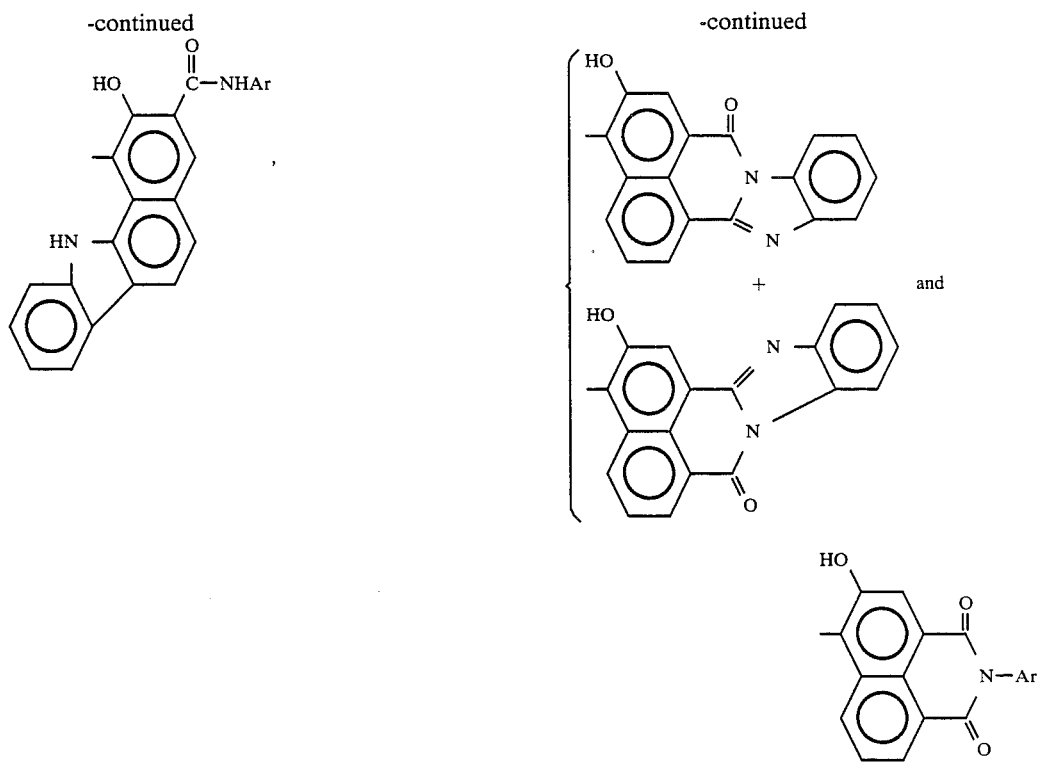
wherein Ar is an aromatic substituent; and a charge transport layer.
33 Claims, 13 Drawing Sheets

Wherein Cp is the azoic coupler and Ar is as defined herein

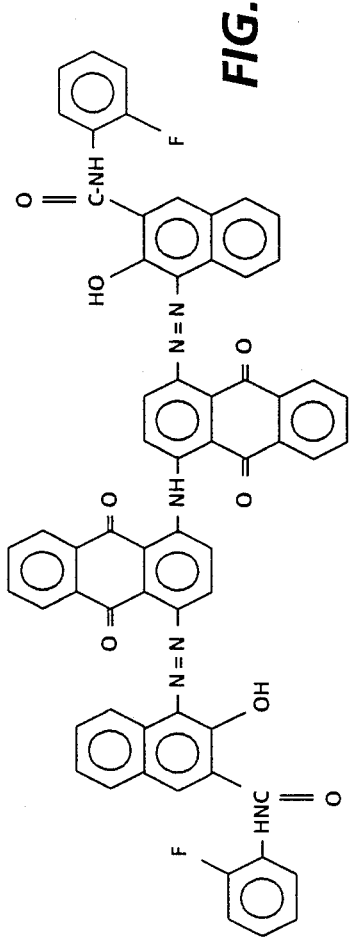

| Compound Figure # | % Yield | C % | | H % | | N % | | Melting Point °C | IR (C=O) cm⁻¹ |
|---|---|---|---|---|---|---|---|---|---|
| | | Found | Calc'd | Found | Calc'd | Found | Calc'd | | |
| 2 | 57 | 72.80 | 73.88 | 3.75 | 3.70 | 9.00 | 9.73 | 300 (dec.) | 1650, 1680 |
| 3 | 63 | 71.98 | 71.97 | 3.91 | 3.87 | 8.67 | 9.18 | >300 | 1647, 1672 |
| 4 | 57 | 71.55 | 71.97 | 3.37 | 3.87 | 8.54 | 9.18 | >300 | 1650, 1674 |
| 5 | 67 | 73.43 | 74.19 | 3.95 | 3.99 | 8.86 | 9.46 | >300 | 1650, 1680 |
| 6 | 67 | 73.41 | 74.19 | 4.06 | 3.99 | 8.76 | 9.46 | 300 (dec.) | 1650, 1678 |
| 7 | 68 | 71.01 | 71.33 | 3.47 | 3.38 | 8.63 | 9.39 | >300 | 1650, 1679 |
| 8 | 72 | 69.55 | 69.15 | 3.27 | 3.28 | 8.55 | 9.10 | >300 | 1652, 1682 |
| 9 | 63 | 68.83 | 69.15 | 3.25 | 3.28 | 8.45 | 9.10 | >300 | 1651, 1680 |
| 10 | 67 | 67.85 | 67.19 | 3.16 | 3.08 | 8.11 | 8.57 | >300 | 1652, 1683 |
| 11 | 60 | 67.39 | 67.19 | 3.02 | 3.08 | 8.06 | 8.57 | >300 | 1652, 1689 |
| 12 | 60 | 68.24 | 67.82 | 3.29 | 3.21 | 10.36 | 11.48 | >300 | 1650, 1682 |
| 13 | 57 | 67.62 | 67.82 | 3.29 | 3.21 | 10.28 | 11.48 | >300 | 1650, 1690 |
| 14 | 72 | 74.36 | 74.50 | 4.21 | 4.26 | 8.64 | 9.21 | 300 (dec.) | 1648, 1680 |
| 15 | 70 | 71.28 | 71.33 | 3.42 | 3.38 | 8.79 | 9.39 | >300 | 1622, 1652, 1683 |
| 16 | 73 | 64.40 | 63.88 | 3.42 | 3.03 | 7.84 | 8.41 | >300 | 1651, 1682 |
| 17 | 28 | 72.05 | 73.24 | 3.98 | 3.80 | 9.27 | 10.12 | >300 | 1670, 1650 |
| 18 | 57 | 75.49 | 76.11 | 4.08 | 3.99 | 7.83 | 8.63 | >300 | 1650, 1680 |
| 19 | 19 | 71.64 | 72.93 | 3.52 | 2.96 | 11.10 | 11.96 | >300 | 1650, 1670, 1712 |

*FIG. 20*

| Compound Figure # | Vddp (V) | Dark Decay (V/sec) | $E_{0.5ddp}$ at 600nm (ergs/cm2) | 650nm |
|---|---|---|---|---|
| 2 | -940 | -30 | 13.6 | 10.8 |
| 3 | -980 | -22 | 19.6 | 18.9 |
| 4 | -930 | -25 | 188 | 110 |
| 5 | -990 | -10 | 81 | 61.7 |
| 6 | -980 | -22 | 65 | 61.7 |
| 7 | --920 | -32 | 18.1 | 16.8 |
| 8 | -930 | -40 | 78.0 | 84 |
| 9 | -970 | -20 | 26.0 | 28.9 |
| 10 | -990 | -9 | 27.5 | 29.9 |
| 11 | -980 | -22 | 10.7 | 11.9 |
| 12 | -980 | -33 | 226 | 291 |
| 13 | -840 | -48 | 17 | 20.1 |
| 14 | -900 | -33 | 22 | 25.4 |
| 15 | -940 | -34 | 135 | 120 |
| 16 | -920 | -40 | 31.1 | 31.1 |
| 17 | -990 | -16 | 90 | - |
| 18 | -960 | -50 | 240 | 250 |
| 19 | -990 | -10 | 405 | 400 |

FIG. 21

BISAZO PHOTOCONDUCTIVE IMAGING MEMBERS

BACKGROUND OF THE INVENTION

This invention is generally directed to layered photoresponsive imaging devices, and more specifically to photoconductive devices having incorporated therein certain novel bisazo compounds. Therefore, in one embodiment of the present invention there are provided photoconductive layered imaging members comprised of certain bisazo compounds and arylamine hole transport layers. In one important embodiment of the present invention, there is provided a photoresponsive device comprised of various specific bisazo compounds, including 4,4'-bis(1"-azo-2"-hydroxy-3"-naphthanilide)-1,1'-dianthraquinonylamine; 4,4'-bis(1"-azo-2"-hydroxy-3"-naphtho-p-trifluoromethylanilide-1,1'-dianthraquinonylamine; and the derivatives thereof; and wherein the member further includes therein a charge, or hole transport layer. The aforementioned photoconductors possess a number of advantages indicated hereinafter inclusive of high photosensitivity, excellent photosensitivity to wavelengths of from about 400 to 750 nanometers, and high cyclic stability; and further, are very economical enabling these devices to be readily disposable. Accordingly, the photoresponsive imaging members of the present invention are useful in various electrophotographic and electrostatographic imaging processes wherein, for example, latent images are formed thereon followed by development and transfer to a suitable substrate. More specifically, the imaging members of the present invention with photosensitivity of from about 400 to about 750 nanometers enabled such members to be useful for electrophotographic imaging devices, and also these members can be incorporated into light emitting diode printers as well as multifunctional printer electrophotographic apparatuses.

Numerous different xerographic photoconductive members are known including, for example, a homogeneous layer of a single material such as vitreous selenium, or a composite layered device containing a dispersion of a photoconductive composition. An example of one type of composite xerographic photoconductive member is described, for example, in U.S. Pat. No. 3,121,006 wherein there is disclosed finely dispersed divided particles of a photoconductive inorganic compound dispersed in an electrically insulating organic resin binder. These members contain, for example, coated on a paper backing, a binder layer containing particles of zinc oxide uniformly dispersed therein. The binder materials disclosed in this patent comprise a material such as polycarbonate resins, polyester resins, polyamide resins, and the like, which are incapable of transporting for any significant distance injected charge carriers generated by the photoconductive particles.

There are also known photoconductive members comprised of inorganic or organic materials wherein the charge carrier generating, and charge carrier transport functions are accomplished by discrete continuous layers. Additionally, layered photoconductive members are disclosed in the prior art which include an overcoating layer of an electrically insulating polymeric material.

Recently, there have been disclosed other layered photoresponsive devices including those comprised of separate generating layers, and transport layers as described in U.S. Pat. No. 4,265,990, and overcoated photoresponsive materials containing a hole injecting layer overcoated with a hole transport layer, followed by an overcoating of a photogenerating layer, and a top coating of an insulating organic resin, reference U.S. Pat. No. 4,251,612. Examples of photogenerating layers disclosed in these patents include trigonal selenium and phthalocyanines, while examples of transport layers include certain diamines as mentioned herein. The disclosures of each of these patents, namely U.S. Pat. Nos. 4,265,990 and 4,251,612, are totally incorporated herein by reference.

Many other patents are in existence describing photoresponsive devices including layered devices containing generating substances, such as U.S. Pat. No. 3,041,167 which discloses an overcoated imaging member containing a conductive substrate, a photoconductive layer, and an overcoating layer of an electrically insulating polymeric material. This member is utilized in an electrophotographic copying system by, for example, initially charging the member with an electrostatic charge of a first polarity, and imagewise exposing to form an electrostatic latent image which can be subsequently developed to form a visible image.

Furthermore, there are disclosed in U.S. Pat. Nos. 4,232,102 and 4,233,383 photoresponsive imaging members comprised of trigonal selenium doped with sodium carbonate, sodium selenite, and trigonal selenium doped with barium carbonate, and barium selenite or mixtures thereof. Moreover, there are disclosed in U.S. Pat. No. 3,824,099 certain photosensitive hydroxy squaraine compositions. According to the disclosure of this patent, the squaraine compositions are photosensitive in normal electrostatographic imaging systems.

Also known are photoconductive members containing therein various squaraine compositions. Thus, for example, there are illustrated in U.S. Pat. No. 4,508,803, the disclosure of which is totally incorporated herein by reference, photoconductive devices containing novel benzyl fluorinated squaraine compositions. Specifically, in one embodiment illustrated in the '803 patent there is described an improved photoresponsive device comprised of a supporting substrate, a hole blocking layer, an optional adhesive interface layer, an inorganic photogenerating layer, a photoconducting composition layer comprised of benzyl fluorinated squaraine compositions, and a hole transport layer. Other representative patents disclosing photoconductive devices with squaraine components therein, or processes for the preparation of squaraines include U.S. Pat. No. 4,507,408; 4,552,822; 4,559,286; 4,507,480; 4,524,220; 4,524,219; 4,524,218; 4,525,592; 4,559,286; 4,415,639; 4,471,041; and 4,486,520. The disclosures of each of the aforementioned patents are totally incorporated herein by reference.

Further, disclosed in the prior art are composite electrophotographic photosensitive materials with various bisazo compounds. For example, there are illustrated in Japanese Ricoh Patent Publication No. 6064354, published Apr. 12, 1985, composite photoconductors wherein one of the photoconductor layers contain a bisazo compound of the formulas as illustrated. Further, there are illustrated in several U.S. patents layered organic electrophotographic photoconductor elements with bisazo, trisazo, or related compounds. Examples of these U.S. pat. Nos. include 4,596,754; 4,555,567; 4,555,667; 4,440,845; 4,486,522; 4,486,800; 4,299,896; 4,551,404; 4,309,611; 4,418,133; 4,293,628; 4,427,753;

4,495,264; 4,359,513; 3,898,084; 4,400,455; 4,390,608; 4,327,168; 4,299,896; 4,314,015; 4,486,522; 4,486,519; and Konishiroku Japanese Patent Laid Open Publication No. 60111247.

Also of interest is U.S. Pat. No. 4,713,307, which illustrates photoconductive imaging members containing a supporting substrate, certain azo pigments of 2,7-bis(1'-azo-2'-hydroxy-3'-naphthanilide) naphthalene, and the derivatives thereof; and a charge transport layer.

Although photoconductive imaging members with bisazo compounds are known, there remains a need for novel bisazo photoconductor devices with extended red or near-IR photoresponses thereby enabling their selection in imaging apparatus with light emitting diodes. Additionally, there continues to be a need for layered photoresponsive imaging members have incorporated therein certain bisazo compounds, which members will enable the generation of acceptable high quality images, and wherein these members can be repeatedly used in a number of imaging cycles without deterioration thereof from the machine environment or surrounding conditions. Moreover, there is a need for improved layered photoresponsive imaging members wherein the bisazo compounds selected for one of the layers are substantially inert to the users of such members. Additionally, there is an important need for layered photoconductors with bisazo compounds, which photoconductors are of low cost, high sensitivity, and possess high cyclic stability. There also is a need for bisazo photoconductors that possess photosensitivity in the wavelength region of from about 650 to about 750 nanometers enabling these photoconductors to be selected for electrophotographic, particularly xerographic, imaging processes; light emitting diode printers; and multifunctional printer electrophotographic apparatuses.

SUMMARY OF THE INVENTION

It is therefore an object of the present invention to provide photoresponsive imaging members containing therein certain novel bisazo compounds.

A further object of the present invention is the provision of improved photoconductive imaging members with excellent extended photosensitivity to wavelengths of from about 650 to 750 nanometers, and excellent cyclic stability.

Additionally, in a further object of the present invention there are provided photoconductive imaging members with 4,4'-bis(1''-azo-2''-hydroxy-3''-naphthanilide)-1,1'-dianthraquinonylamine; 4,4'-bis(1''-azo-2''-hydroxy-3''-naphtho-p-trifluoromethylanilide)-1,1'-dianthraquinonylamine; or 4,4'-bis(1''-azo-2''-hydroxy-3''-naphtho-p-fluoroanilide)-1,1'-dianthraquinonylamine as photogenerating pigments.

Another object of the present invention resides in the provision of organic layered photoconductive imaging members containing therein certain bisazo compounds as photogenerating layers and aryl amine hole transport layers.

In yet another specific object of the present invention there are provided improved layered photoresponsive electrophotographic imaging members containing the bisazo compounds illustrated herein functioning as photogenerating layers situated between a supporting substrate, and an aryl amine hole transport layer.

Further, in yet another object of the present invention there are provided imaging and printing methods with the improved photoresponsive imaging members illustrated herein.

Also, in a further important object of the present invention there are provided disposable bisazo photoresponsive imaging members that are highly panchromatic, that is with, for example, a photosensitivity of from about 400 to about 750 nanometers.

Moreover, another object of the present invention resides in the provision of bisazo photoresponsive imaging members which can be selected for electrophotographic, particularly xerographic, imaging apparatuses for light emitting diode printers (or diode laser printers).

These and other objects of the present invention are accomplished by the provision of layered photoconductive imaging members containing therein certain bisazo compounds. More specifically, the layered photoconductive imaging members of the present invention are comprised of specific bisazo compounds, which function as a photogenerating source, and in contact therewith a hole transport layer preferably comprised of aryl diamines.

Accordingly, the photoconductive layered imaging members of the present invention are comprised of, for example, a supporting substrate, a charge transport layer, and a bisazo compound of the formula.

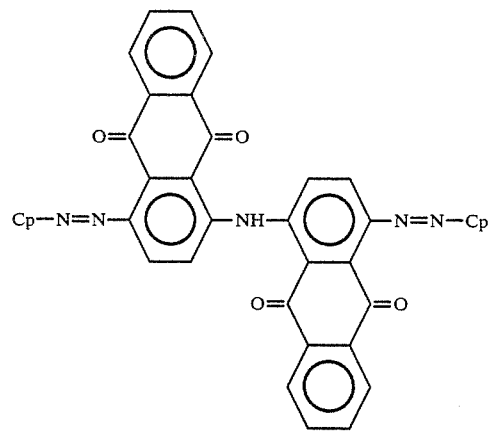

wherein Cp is an azoic coupler and is selected from the group consisting of

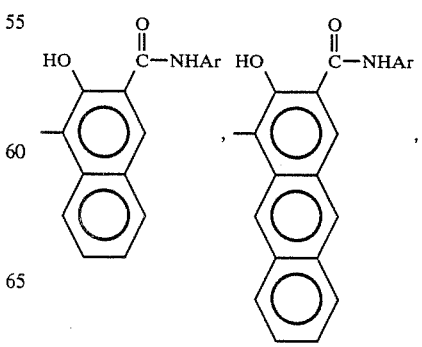

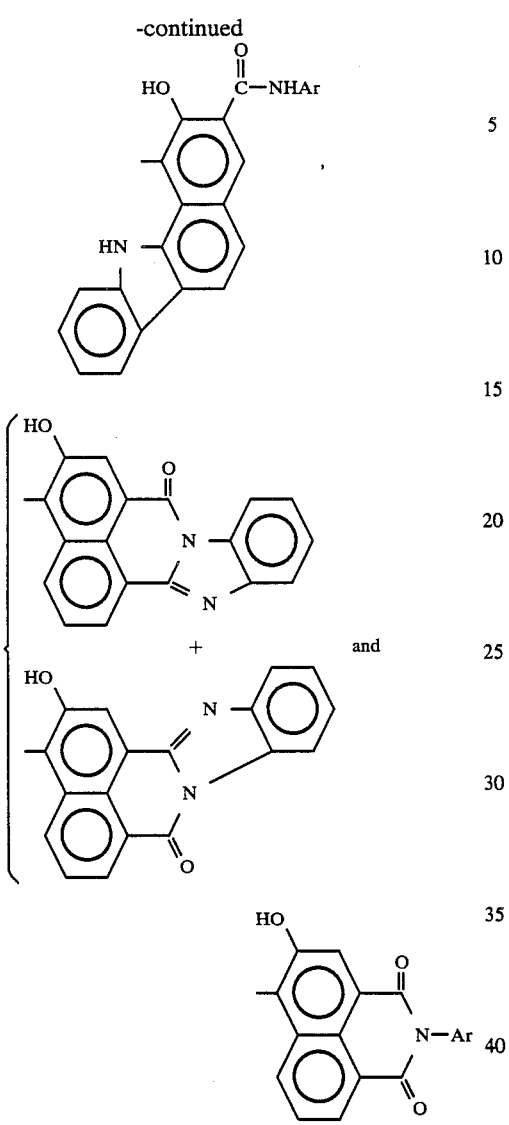

wherein Ar is an aromatic substituent including substituted aromatic component; and a charge transport layer. The aforementioned cis, trans isomers are usually present as a mixture thereof in a ratio of, for example, 1:1. Also, examples of aromatic substituents (Ar) include those containing, for example, from about 6 to about 24 carbon atoms such as phenyl, naphthyl, anthryl, and the like.

Examples of bisazo compounds selected for the photoconductive imaging members of the present invention are represented by FIGS. 1 to 19. The aromatic substituents may be substituted with various groups including nitro; alkoxy, preferably 1 to about 10 carbon atoms, such as methoxy, ethoxy, propoxy; alkyl from 1 to about 10 carbon atoms such as methyl, ethyl, butyl, propyl; the halogens chloride, bromide, iodide, fluoride; trihalomethyl; nitro; and the like.

Specific examples of bisazo compounds selected for the photoconductive imaging members of the present invention include 4,4'-bis(1''-azo-2''-hydroxy-3''-naphthanilide)-1,1'-dianthraquinonylamine; 4,4'-bis(1''-azo-2''-hydroxy-3''-naphtho-p-fluoroanilide)-1,1'-dianthraquinonylamine; 4,4'-bis(1''-azo-2''-hydroxy-3''-naphtho-p-trifluoromethylanilide)-1,1'-dianthraquinonylamine; 4,4'-bis(1''-azo-2''-hydroxy-3''-naphtho-p-methoxyanilide)-1,1'-dianthraquinonylamine; 4,4'-bis(1''-azo-2''-hydroxy-3''-naphtho-o-ethylanilide)-1,1'-dianthraquinonylamine 4,4'-bis(1''-azo-2''-hydroxy-3''-naphtho-p-chloroanilide)-1,1'-dianthraquinonylamine; 4,4'-bis(1''-azo-2''-hydroxy-3''-naphtho-p-bromoanilide)-1,1'-dianthraquinonylamine; 4,4'-bis(1''-azo-2''-hydroxy-3''-naphtho-p-nitroanilide)-1,1'-dianthraquinonylamine; 4,4'-bis(1''-azo-2''-hydroxy-3''-naphtho-p-methylanilide)-1,1'-dianthraquinonylamine; and 4,4'-bis(1''-azo-2''-hydroxy-3''-naphtho-p-bromoanilide)-1,1'-dianthraquinonylamine.

With further respect to the photoconductive imaging members of the present invention, the photogenerating bisazo compounds can be situated between the supporting substrate and the aryl amine hole transport layer; or alternatively, the aryl amine hole transport layer may be situated between the supporting substrate and the layer comprised of the photogenerating bisazo compounds illustrated herein.

In another specific illustrative embodiment, the improved photoconductive imaging member of the present invention is comprised of (1) a supporting substrate; (2) a hole blocking layer; (3) an optional adhesive interface layer; (4) a photogenerating layer comprised of bisazo compounds selected from the group consisting of those represented by FIGS. 1 to 19; and (5) a hole transport layer. Therefore, the photoconductive imaging member of the present invention in one important embodiment is comprised of a conductive supporting substrate, a hole blocking metal oxide or siloxane layer in contact therewith, an adhesive layer, a photogenerating layer comprised of bisazo compounds selected from the group consisting of those represented by the formulas of FIGS. 2 through 19 overcoated of the adhesive layer, and as a top layer a hole transport layer comprised of certain aryl amines dispersed in a resinous binder.

Various known processes can be selected for the preparation of the photoconductive imaging members of the present invention, the process parameters in the order of coating of the layers being dependent on the member desired. Specifically, for example, in one method the bisazo photogenerating layer is deposited on a supporting substrate by vacuum sublimation, and subsequently the hole transport layer is deposited thereover by solution coating. In another process variant, the layered photoconductive device can be prepared by providing the conductive substrate containing the hole blocking layer in an optional adhesive layer and applying thereto by solvent coating processes, laminating processes, or other methods, the bisazo photogenerating layer, and a hole transport layer.

In one specific preparation sequence, there is provided a 20 percent transmissive aluminized Mylar substrate of a thickness of about 3 mils which is coated with a Bird film applicator at about room temperature with an adhesive, such as that available from E.I. DuPont as 49,000, containing methylene chloride-trichloro ethane solvent, followed by drying at 100° C. Subsequently, there is applied to the adhesive layer an bisazo photogenerating layer selected from the group consisting of compounds of the formulas of FIGS. 1 to 19, which application is also accomplished with a Bird applicator, with annealing at 135° C., followed by coating of the amine transport layer. The aforementioned amine transport layer is applied by known solution coating techniques with a 5 mil Bird applicator and annealing at 135° C., wherein the solution contains about 20 to about 80 percent by weight of the amine transport molecule and from about 80 to about 20 percent by weight of a resinous binder substance such as a polycarbonate material.

The improved photoconductive imaging members of the present invention can be incorporated into numerous imaging processes and apparatuses, inclusive of those well known such as xerographic imaging processes. Also, the imaging members of the present invention are particularly useful in electrophotographic imaging apparatus wherein wavelengths of from about 650 to about 750 are generated. The imaging members of the present invention are particularly useful in xerographic imaging apparatuses and light emitting diode (LED) printing apparatuses, particularly those functioning at 660 nanometers.

The bisazo photogenerating compounds illustrated herein can be prepared by a number of processes as illustrated hereinafter. More specifically, for example, the bisazo compounds represented by the formula with Cp therein are generally prepared by initially tetrazotizing 4,4'-diamino-1,1'-dianthraquinonylamine with an excess amount, about 2 to about 10, and preferably 2 to about 6 equivalents of a metallic nitrite, such as sodium nitrite, at about −10° C. to 25° C. in an acid aqueous solution, such as hydrochloric acid. The tetrazonium salts formed were usually isolated as fluoroborate or hexafluorophosphate salts, which isolation was accomplished by adding from about 2 to about 50 and preferably about 10 equivalents, $HBF_4$ or $HPF_6$ to the tetrazonium salt solution. Thereafter, the salts were dissolved in dimethyl formamide or other similar solvent at 0° C. to 30° C., and the resulting mixture is allowed to react with about 2 equivalent or more of an azoic coupler, such as 2-hydroxy-3-naphthanilide, at a temperature of from about 0° C. to 30° C.; thereafter, the desired azo pigments were precipitated out of the solution when about 2 equivalents of a base, such as sodium acetate, was introduced therein. Subsequently, azo pigments were isolated by filtration and purified by repetitive solvent washings. The azo pigment products were characterized by elemental analysis, melting point, and IR spectroscopy.

For the compounds represented by the formulas of FIGS. 2 to 19, the couplers selected were 2-hydroxy-3-naphthanilide; 2-hydroxy-3-naphtho-o-methoxyanilide; 2-hydroxy-3-naphtho-p-methoxyanilide; 2-hydroxy-3-naphtho-o-methoxyanilide; 2-hydroxy-3-naphtho-p-methylanilide; 2-hydroxy-3-naphtho-p-fluoroanilide; 2-hydroxy-3-naphtho-o-chloroanilide; 2-hydroxy-3-naphtho-p-chloroanilide; 2-hydroxy-3-naphtho-m-trifluoromethylanilide; 2-hydroxy-3-naphtho-p-trifluoromethylanilide; 2-hydroxy-3-naphtho-o-nitroanilide; 2-hydroxy-3-naphtho-p-nitroanilide; 2-hydroxy-3-naphtho-o-ethylanilide; 2-hydroxy-3-naphtho-o-fluoroanilide; 2-hydroxy-3-naphtho-p-bromoanilide; Naphthol AS-SG; Naphthol AS-GR; and 3-hydroxy-1,8-benzimidazole-naphthalene, respectively.

BRIEF DESCRIPTION OF THE DRAWINGS

For a better understanding of the present invention and further features thereof, reference is made to the following detailed description of various preferred embodiments wherein FIGS. 1 to 19 represent bis azo photogenerating pigments;

FIG. 20 represents analytical data and some characteristics for the compounds of FIGS. 2 to 19;

FIG. 21 represents imaging characteristic data for imaging member containing the compounds of FIGS. 2 to 19.

DESCRIPTION OF THE PREFERRED EMBODIMENTS

Preferred embodiments will now be illustrated with reference to specific photoconductive imaging members containing the bisazo compounds illustrated herein, it being noted that equivalent compositions are also embraced within the scope of the present invention.

Figure 22:
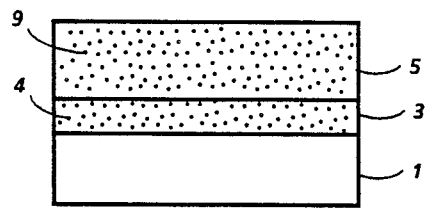
FIGS. 22, 23 and 24 are partially schematic cross-sectional views of the photoconducting members of the present invention.

Illustrated in FIG. 22 is a photoconductive imaging member of the present invention comprised of a supporting substrate 1, a photogenerating layer 3 comprised of an bisazo pigment selected from the group consisting of those represented by the formulas of FIGS. 1 to 19, respectively, and preferably 4,4'-bis(1''-azo2''-hydroxy-3''-naphthanilide)-1,1'-dianthraquinonylamine; 4,4'-bis(1''-azo-2''-hydroxy-3''-naphtho-p-fluoroanilide)-1,1'-dianthraquinonylamine; 4,4'-bis(1''-azo-2''-hydroxy-3''-naphtho-p-trifluoromethylanilide)-1,1'-dianthraquinonylamine; 4,4'-bis(1''-azo-2''-hydroxy-3''-naphtho-p-methoxyanilide)-1,1'-dianthraquinonylamine; 4,4'-bis(1''-azo-2''-hydroxy-3''-naphtho-o-ethylanilide)-1,1'-dianthraquinonylamine; 4,4'-bis(1''-azo-2''-hydroxy-3''-naphtho-p-chloroanilide)-1,1'-dianthraquinonylamine; 4,4'-bis(1''-azo-2''-hydroxy-3''-naphtho-p-bromoanilide)-1,1'-dianthraquinonylamine; 4,4'-bis(1''-azo-2''-hydroxy-3''-naphtho-p-nitroanilide)-1,1'-dianthraquinonylamine; 4,4'-bis(1''-azo-2''-hydroxy-3''-naphtho-p-methylanilide)-1,1'-dianthraquinonylamine; and 4,4'-bis(1''-azo-2''-hydroxy-3''-o-methylanilide)-1,1'-naphtho-p-dianthraquinonylamine optionally dispersed in a resinous binder composition 4, and a charge carrier hole transport layer 5 dispersed in an inactive resinous binder composition 9.

Figure 1:
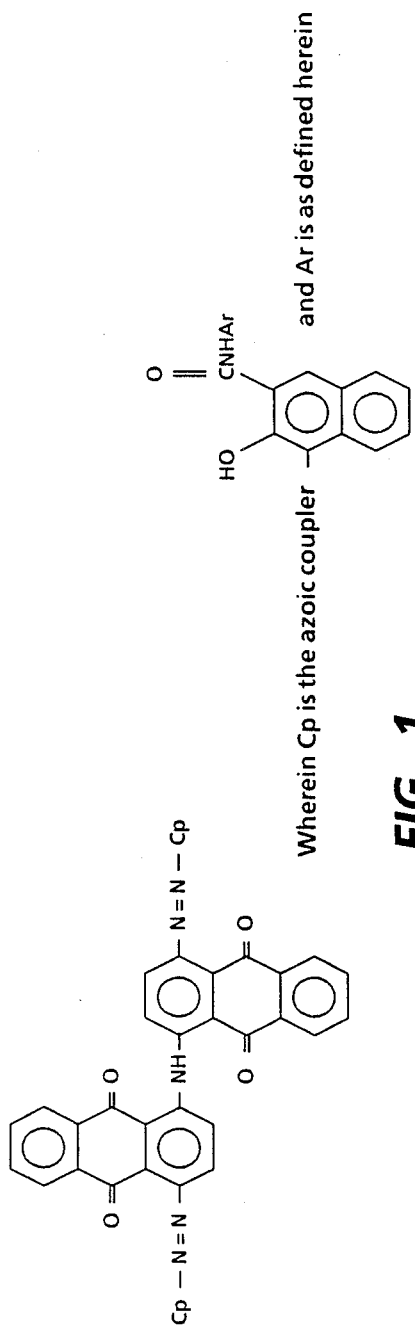
Figure 2:
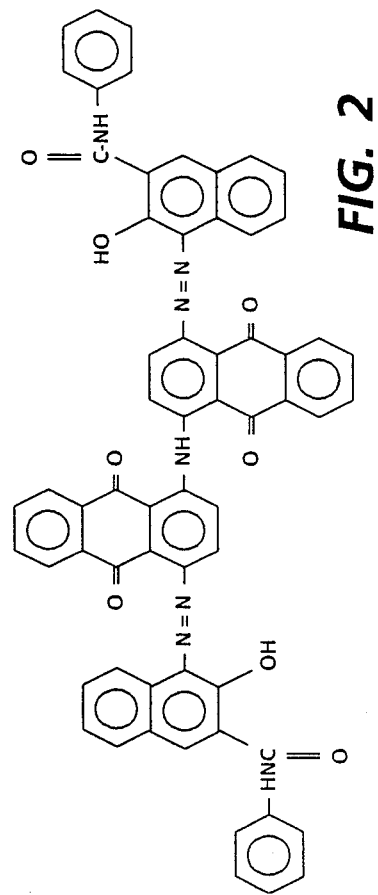
Figure 3:
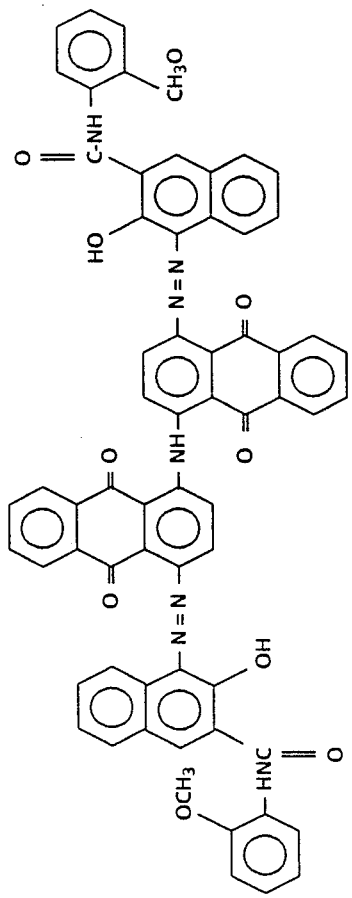
Figure 4:
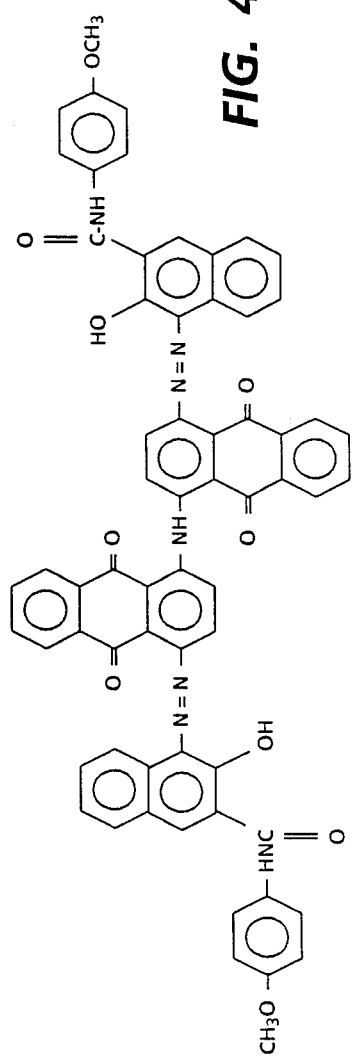
Figure 5:
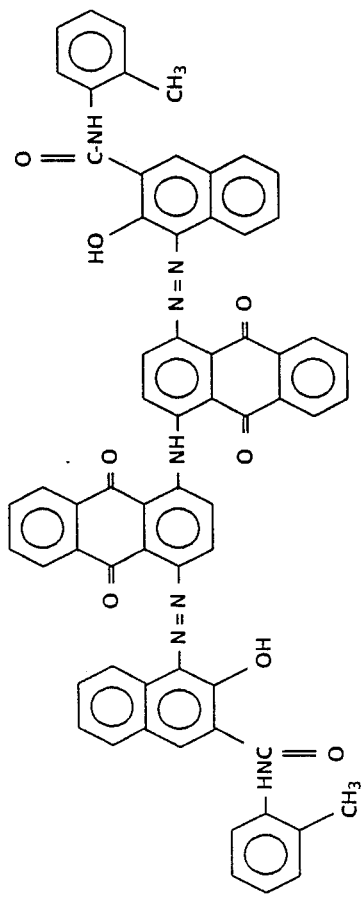
Figure 6:
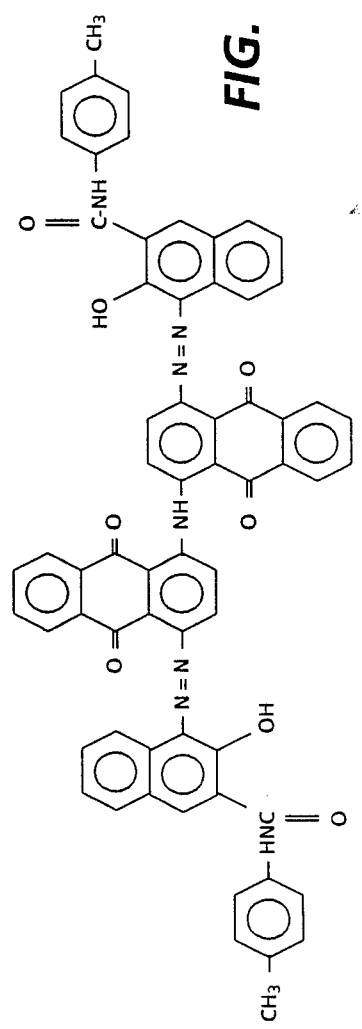
Figure 7:
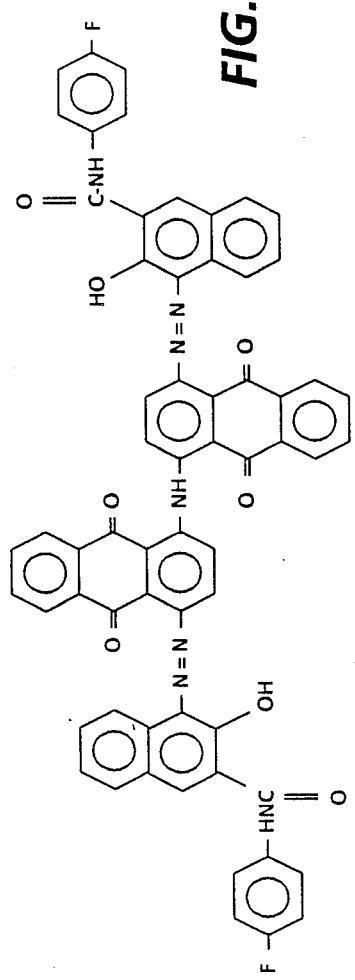
Figure 8:
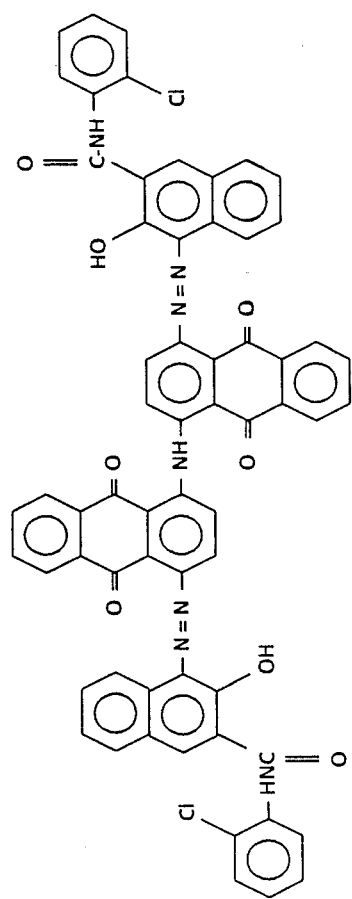
Figures 9, 10:
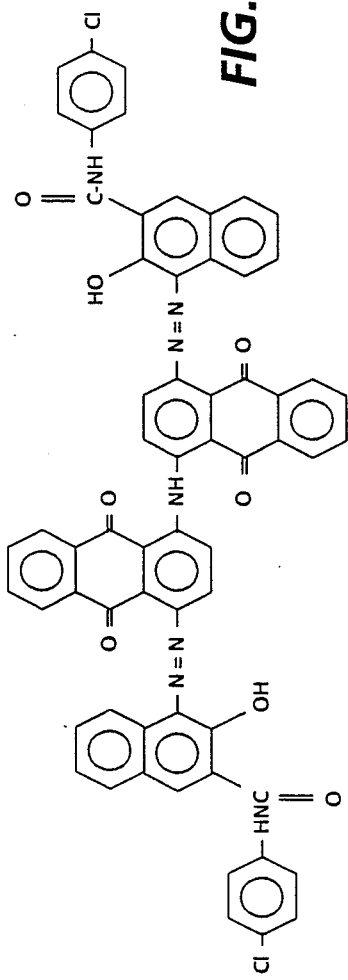
Figure 11:
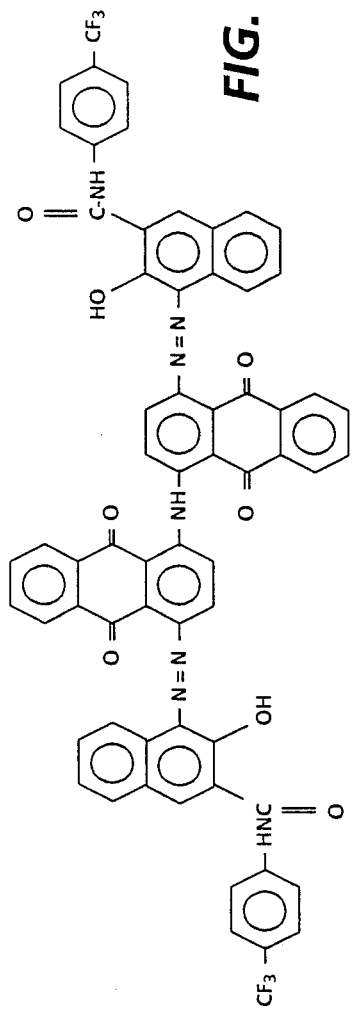
Figure 12:
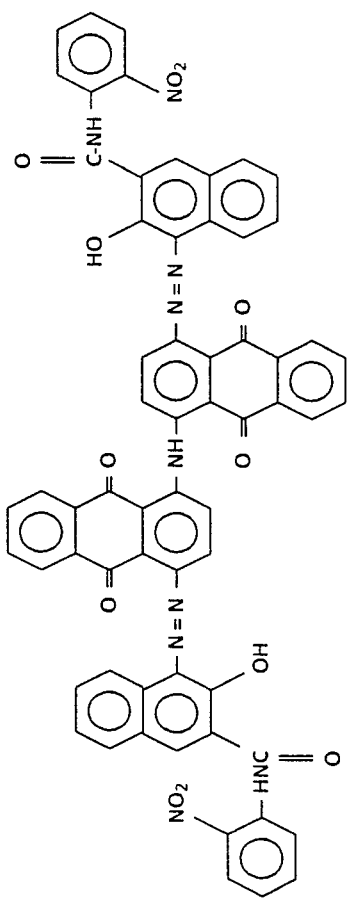
Figure 13:
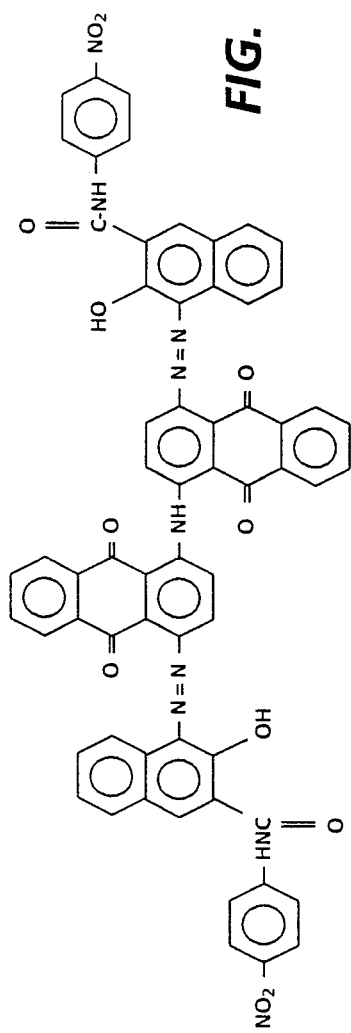
Figure 14:
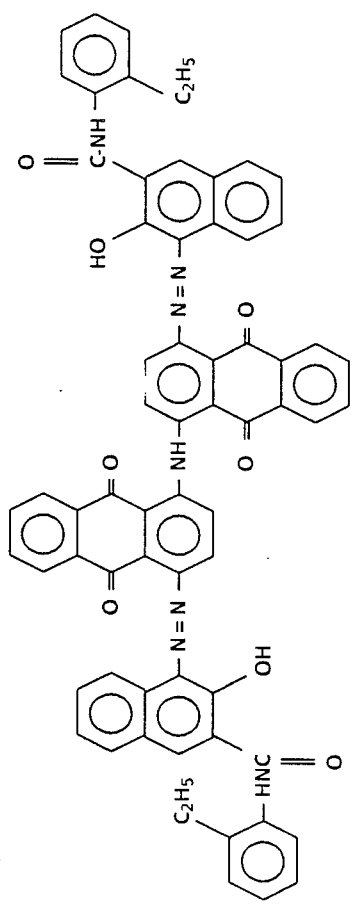
Figure 17:
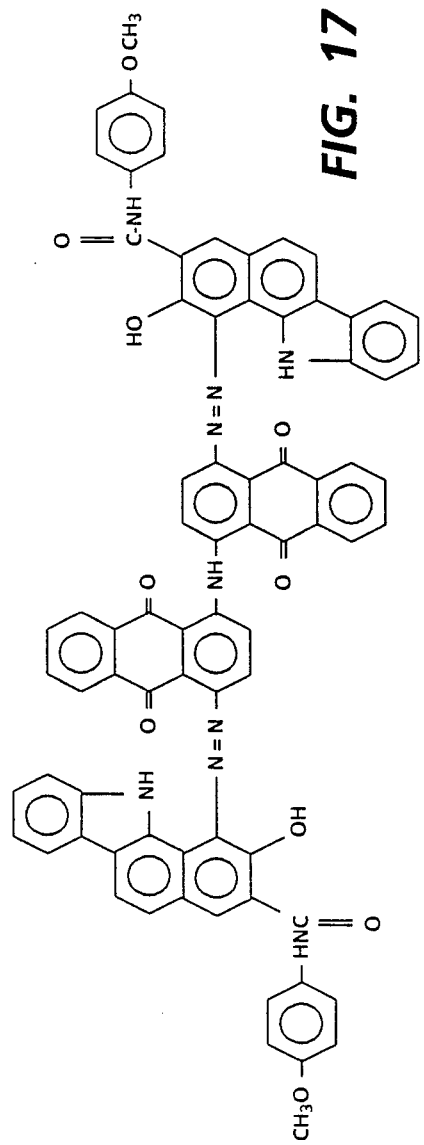
Figure 18:
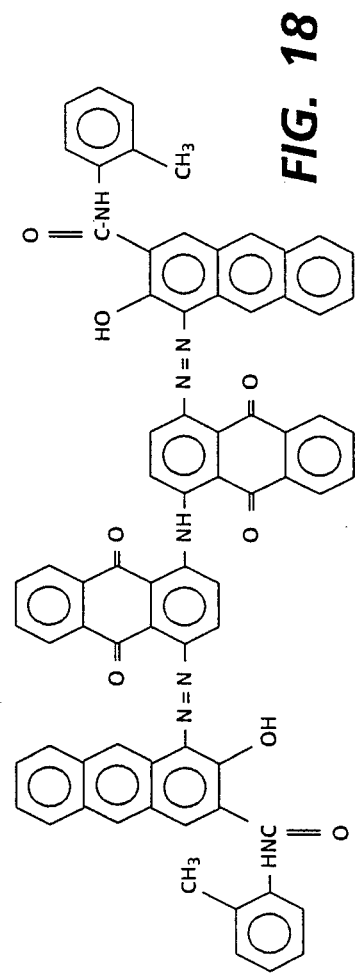
Figure 19:
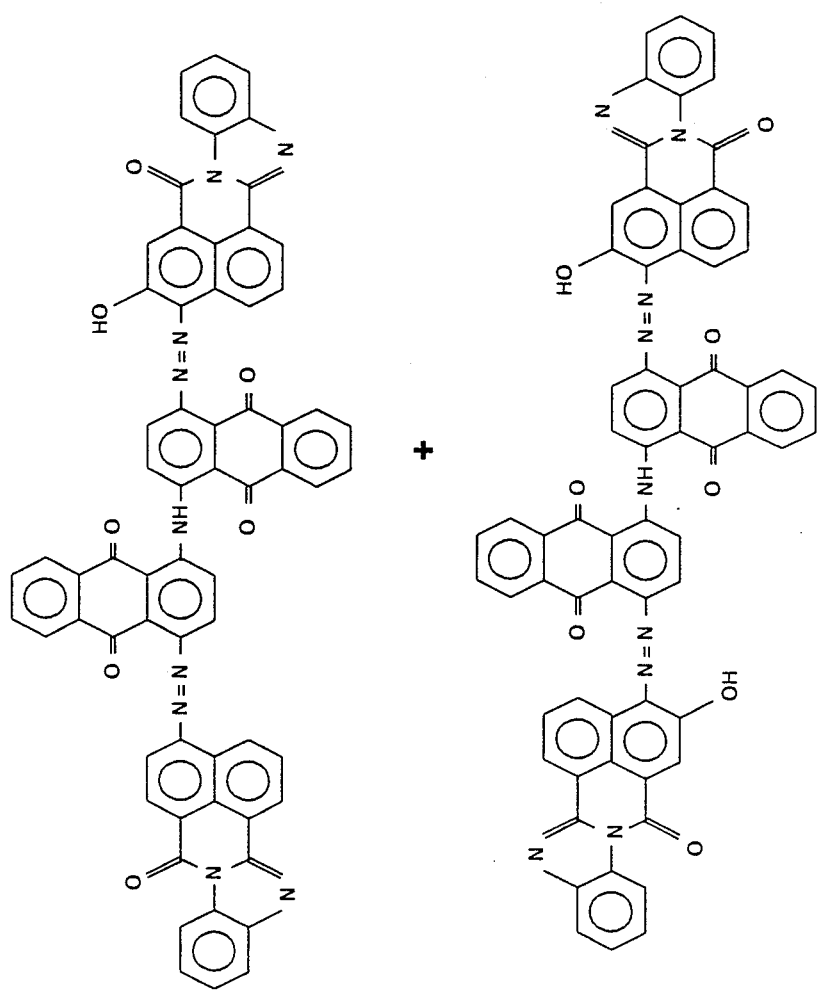
Figure 23:
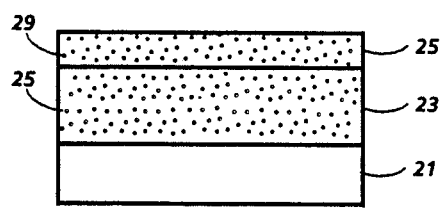

Illustrated in FIG. 23 is essentially the same member as shown in FIG. 1 with the exception that the hole transport layer is situated between the supporting substrate and the photogenerating layer. More specifically, with reference to this Figure, there is illustrated a photoconductive imaging member comprised of a supporting substrate 21, a hole transport layer 23 comprised of a hole transport composition dispersed in an inactive resinous binder composition 25, and a photogenerating layer 27 comprised of the bisazo compounds of the photoconductive member of FIG. 1 optionally dispersed in a resinous binder composition 29.

Figure 24:
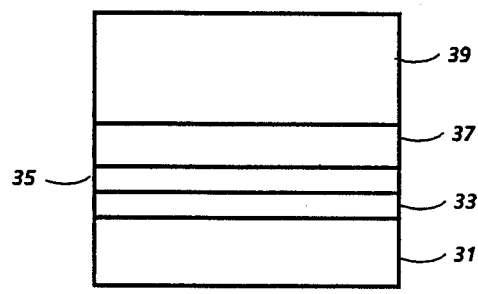

Illustrated in FIG. 24 is a photoconductive imaging member of the present invention comprised of a supporting substrate 31, a hole blocking layer 33, an optional adhesive layer 35, a bisazo photogenerating layer 37 comprised of a bisazo compound selected from the group consisting of those represented by 4,4'-bis(1''-azo-2''-hydroxy-3''-naphthanilide)-1,1'-dianthraquinonylamine; 4,4'-bis(1''-azo-2''-hydroxy-3''-naphtho-p-fluoroanilide)-1,1'-dianthraquinonylamine; 4,4'-bis(1''-azo-2''-hydroxy-3''-naphtho-p-trifluoromethylanilide)-1,1'-dianthraquinonylamine; 4,4'-bis(1''-azo-2''-hydroxy-3''-naphtho-p-methoxyanilide)-1,1'-dianthraquinonylamine; 4,4'-bis(1''-azo-2''-hydroxy-3''-naphtho-o-ethylanilide)-1,1'-dianthraquinonylamine; 4,4'-bis(1''-azo-2''-hydroxy-3''-naphtho-p-chloroanilide)-1,1'-dianthraquinonylamine; 4,4'-bis(1''- azo-2″-hydroxy-3″-naphtho-p-bromoanilide)-1,1′-dianthraquinonylamine; 4,4′-bis(1″-azo-2″-hydroxy-3″-naphtho-p-nitroanilide)-1,1′-dianthraquinonylamine; 4,4′-bis(1″-azo-2″-hydroxy-3″-naphtho-p-methylanilide)-1,1′-dianthraquinonylamine; and 4,4′-bis(1″-azo-2″-hydroxy-3″-naphtho-o-methylanilide)-1,1′-dianthraquinonylamine; and a charge carrier or hole transport layer 39. The photogenerating layer is generally comprised of the bisazo compound optionally dispersed in a resinous binder composition, and similarly the charge transport layer such as aryl diamines are dispersed in inactive resinous binder materials.

With further reference to FIGS. 22 to 24, the substrates may comprise a layer of insulating material such as an inorganic or organic polymeric material, including Mylar a commercially available polymer; a layer of an organic or inorganic material having a semiconductive surface layer, such as indium tin oxide or aluminum, arranged thereon, or a conductive material such as, for example, aluminum, chromium, nickel, brass, or the like. The substrate may be flexible or rigid and many have a number of many different configurations, such as for example, a plate, a cylindrical drum, a scroll, an endless flexible belt, and the like. Preferably, the substrate is in the form of an endless flexible belt. In some situations, it may be desirable to coat on the back of the substrate, particularly when the substrate is an organic polymeric material, an anticurl layer, such as for example, polycarbonate materials commercially available as Makrolon.

The thickness of the substrate layer depends on many factors, including economical considerations, thus this layer may be of substantial thickness, for example over 100 mils, or of minimum thickness providing there are no adverse effects on the system. In one preferred embodiment, the thickness of this layer is from about 3 mils to about 10 mils.

The hole blocking layers can be comprised of various suitable known materials including aluminum oxide, siloxanes, or silanes, reference U.S. Pat. No. 4,464,450, the disclosure of which is totally incorporated herein by reference, and the like. The primary purpose of this layer is to provide hole blocking, that is to prevent hole injection from the substrate during and after charging. Typically, this layer is of a thickness of less than 500 Angstroms.

The adhesive layers are typically comprised of a polymeric material including polyesters, polyvinyl butyral, polyvinyl pyrrolidone, and the like. Typically, this layer is of a thickness of less than about 0.6 micron.

Examples of the photogenerating layers include the bisazo compounds as illustrated hereinbefore. Generally, this layer is of a thickness of from about 0.05 micron to about 10 microns, or more; and preferably is of a thickness of from about 0.2 micron to about 3 microns; however, the thickness of this layer is primarily dependent on the photogenerating weight loading which may vary from about 5 to 100 percent. Also, it is desirable to provide this layer in a thickness which is sufficient to absorb about 90 percent or more of the incident radiation which is directed upon it, and the imagewise or printing exposure step. The maximum thickness of this layer is dependent primarily upon factors such as mechanical considerations, for example, whether a flexible photoconductive imaging member is desired, the thickness of the other layers, and the specific bisazo compound selected.

Various suitable charge transport layers can be selected for the photoconductive imaging member of the present invention, which layer has a thickness of from about 5 microns to about 50 microns; and preferably is of a thickness of from about 10 microns to about 40 microns. In a preferred embodiment, this transport layer comprises aryl amine molecules of the following formula

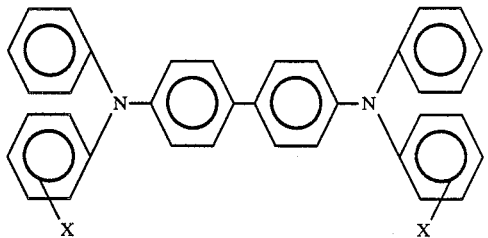

dispersed in a highly insulating and transparent organic resinous binder wherein X is selected from the group consisting of alkyl and aryl, especially (ortho) $CH_3$, (meta) $CH_3$, (para) $CH_3$, (ortho) Cl, (meta) Cl, and (para) Cl. The highly insulating resin, which has a resistivity of at least $10^{12}$ ohm-cm to prevent undue dark decay, is a material which is not necessarily capable of supporting the injection of holes. However, the insulating resin becomes electrically active when it contains from about 10 to 75 weight percent of the substituted N,N,N′,N′-tetraphenyl[1,1-biphenyl]4,4′-diamines corresponding to the foregoing formula.

Compounds corresponding to the above formula include, for example, N,N′-diphenyl-N,N′-bis(alkylphenyl)-[1,1-biphenyl]-4,4′-diamine wherein the alkyl is selected from the group consisting of methyl such as 2-methyl, 3-methyl and 4-methyl, ethyl, propyl, butyl, hexyl and the like. With halo substitution, the amine is N,N′-diphenyl-N,N′-bis(halo phenyl)-[1,1′-biphenyl]-4,4′-diamine wherein halo is 2-chloro, 3-chloro or 4-chloro.

Other electrically active small molecules which can be dispersed in the electrically inactive resin to form a layer which will transport holes include, bis(4-diethylamino-2-methylphenyl)phenyl methane; 4′,4″-bis(-diethylamino)-2′,2″-dimethyltriphenyl methane; bis-4-(diethylaminophenyl)phenyl methane; and 4,4′-bis(diethylamino)-2,2′-dimethyltriphenyl methane.

Providing the objectives of the present invention are achieved, other charge carrier transport molecules can be selected for the photoconductive imaging member of the present invention.

Examples of the highly insulating and transparent resinous material or inactive binder resinous material for the transport layers include materials such as those described in U.S. Pat. No. 3,121,006, the disclosure of which is totally incorporated herein by reference. Specific examples of organic resinous materials include polycarbonates, acrylate polymers, vinyl polymers, cellulose polymers, polyester, polysiloxanes, polyamides, polyurethanes and epoxies as well as block, random or alternating copolymers thereof. Preferred electrically inactive binder materials are polycarbonate resins having a molecular weight (Mw) of from about 20,000 to about 100,000 with a molecular weight in the range of from about 50,000 to about 100,000 being particularly preferred. Generally, the resinous binder contains from about 10 to about 75 percent by weight of the active material corresponding to the foregoing formula, and preferably from about 35 percent to about 50 percent of this material.

Similar binder materials can be selected for the bisazo photogenerating layer, inclusive of those as illustrated in U.S. Pat. No. 3,121,006, the disclosure of which is totally incorporated herein by reference. A preferred binder material for the bisazo photogenerating layer is a poly(vinyl acetal) polymer.

Also included within the scope of the present invention are methods of imaging with the photoresponsive devices illustrated herein. These methods of imaging generally involve the formation of an electrostatic latent image on the imaging member, followed by developing the image with known developer compositions, inclusive of those containing toner resin particles such as styrene methacrylates, pigment particles such as carbon black, and charge enhancing additives such as cetyl pyridinium chloride, reference U.S. Pat. No. 4,289,672, the disclosure of which is totally incorporated herein by reference, subsequently transfering the image to a suitable substrate and permanently affixing the image thereto.

The invention will now be described in detail with reference to specific preferred embodiments thereof, it being understood that these examples are intended to be illustrative only. The invention is not intended to be limited to the materials, conditions, or process parameters recited herein, it being noted that all parts and percentages are by weight unless otherwise indicated.

EXAMPLE I

There was prepared the tetrazonium salt of 4,4'-diamino-1,1'-dianthraquinonylamine by azotizing a diamine compound in concentrated hydrochloric acid. Initially, 4,4'-diamino-1,1'-dianthraquinonylamine (2.06 grams, 5 millimoles) was ground in a mortar to a fine powder in 10 milliliters of concentrated hydrochloric acid. The paste obtained was transferred to a 300 milliliter three necked flask and was diluted with 90 milliliters of concentrated hydrochloric acid. Subsequently, the resulting mixture was stirred in a warm water bath for about 1 hour and then cooled to below 5° C. by an ice bath. The diamine was tetrazotized with an excess amount of sodium nitrite (1.6 grams $NaNO_2$ in 4 milliliters of water). The product mixture was stirred for about 1 hour and was filtered to remove any insoluble solid. The insoluble solid was washed with concentrated HCl (2×25 milliliters). To the combined filtrate, 30 milliliters of $HPF_6$ solution (available from Aldrich, Inc., 60 percent by weight) and about 200 milliliters of water were added. After stirring for about half an hour, the precipitate tetrazonium product was isolated by filtration. The product was washed with cold water, methanol and ether to yield the above tetrazonium salt product after vacuum drying. IR(KBr): 2,246 cm$^{-1}$, ($-N^{\oplus}\equiv N$), 1,680 and 1,665 cm$^{-1}$, (C=O) about 2.1 grams (60 percent).

EXAMPLE II

There was prepared the photogenerating bisazo pigment 4,4'-bis(1''-azo-2''-hydroxy-3''-naphthanilide)-1,1'-dianthraquinonylamine by a coupling reaction between the tetrazonium salt obtained by the process of Example I, and an excess amount of 2-hydroxy-3-naphthanilide in dimethylformamide in the presence of aqueous solution of sodium acetate. The tetrazonium salt (about 2.1 grams) obtained from Example I was dissolved in 40 milliliters cold dimethylformamide. Thereafter, 2-hydroxy-3-naphthanilide (1.95 grams in 200 milliliters DMF) was added slowly to the salt solution, which was maintained at a temperature of 5° C. by an ice bath. Sodium acetate (3.66 grams in 55 milliliters water) was then added dropwise in about 30 minutes. The resulting mixture was stirred at room temperature overnight. After filtration, the crude product resulting was washed with warm water (2×250 milliliters), warm DMF (dimethyl formamide) (3×250 milliliters), acetone (250 milliliters), and ether (250 milliliters) to yield 4,4'-bis(1''-azo-2''-hydroxy-3''-naphthanilide)-1,1'-dianthraquinonylamine, 1.55 grams, 57 percent (based on the tetrazonium salt). m.p.: 300° C. (dec.); IR(KBr): 1,650 and 1,680 cm$^{-1}$. Analysis calculated for $C_{62}H_{37}N_7O_8$: C73.88, H3.70, N9.73; Found C72.80, H3.75; N9.00.

EXAMPLE III

Other bisazo compounds of FIG. 1 were prepared by repeating the procedures of Examples I and II with the exception that there were selected as azo couplers 2-hydroxy-3-naphtho-p-fluoroanilide; 2-hydroxy-3-naphtho-p-trifluoromethylanilide; 2-hydroxy-3-naphtho-o-methyoxyanilide; 2-hydroxy-3-naphtho-o-ethylanilide; 2-hydroxy-3-naphtho-p-chloroanilide; 2-hydroxy-3-naphtho-p-bromoanilide; 2-hydroxy-3-naphtho-p-nitroanilide; 2-hydroxy-3-naphtho-p-methylanilide; and other similar azo couplers resulting in the bisazo products 4,4'-bis(1''-azo-2''-hydroxy-3''-naphthanilide)-1,1'-dianthraquinonylamine; 4,4'-bis(1''-azo-2''-hydroxy-3''-naphtho-p-fluoroanilide)-1,1'-dianthraquinonylamine; 4,4'-bis(1''-azo-2''-hydroxy-3''-naphtho-p-trifluoromethylanilide)-1,1'-dianthraquinonylamine; 4,4'-bis(1''-azo-2''-hydroxy-3''-naphtho-p-methoxyanilide)-1,1'-dianthraquinonylamine; 4,4'-bis(1''-azo-2''-hydroxy-3''-naphtho-o-ethylanilide)-1,1'-dianthraquinonylamine; 4,4'-bis(1''-azo-2''-hydroxy-3''-naphtho-p-chloroanilide)-1,1'-dianthraquinonylamine; 4,4'-bis(1''-azo-2''-hydroxy-3''-naphtho-p-bromoanilide)-1,1'-dianthraquinonylamine; 4,4'-bis(1''-azo-2''-hydroxy-3''-naphtho-p-nitroanilide)-1,1'-dianthraquinonylamine; 4,4'-bis(1''-azo-2''-hydroxy-3''-naphtho-p-methylanilide)-1,1'-dianthraquinonylamine; and 4,4'-bis(1''-azo-2''-hydroxy-3''-naphtho-p-bromoanilide)-1,1'-dianthraquinonylamine.

EXAMPLE IV

There was prepared a photoconductive imaging member containing as the photogenerating bis compounds the 4,4'-bis(1''-azo-2''-hydroxy-3''-naphthanilide)-1,1'-dianthraquinonylamine prepared in accordance with the process of Example II. The photogenerating pigment dispersion was prepared by first dissolving 52.8 milligrams of poly(vinyl formal) in 10 milliliters of tetrahydrofuran in a 1 ounce brown bottle. The above bis compound, 211.2 milligrams, and ~90 grams of steel shots (⅛ inch diameter, #302 grade) were added to the polymer solution. The brown bottle was then placed in a Red Devil Paint Conditioner (Model 5100X) and was shaken for 30 minutes. The resulting dispersion was coated onto a 7.5 inch × 10 inch aluminum substrate using a Gardner Mechanical Drive Film Application with a 6 inch wide Bird Film Applicator (0.5 mil wet gap) inside a humidity-controlled glove box. The relative humidity of the glove box was controlled by dry air and was <25 percent for all the coatings accomplished. The resulting carrier generation layer (CGL) was air-dried for ~30 minutes and vacuum-dried at 100° C. for ~1 hour before further coating. The thickness of the CGL was found to be ~0.5 μm as estimated from TEM micrographs.

A transport layer composed of about 60 percent by weight of Makrolon ® polycarbonate resin available from Larbensabricken Bayer AG, mixed with 40 percent by weight of N,N'-bis(3-methylphenyl)-1,1'-biphenyl-4,4'-diamine was then prepared. This solution which was comprised of 4.2 grams of Makrolon ®, 2.8 grams of the diamine, and 31 milliliters of methylene chloride was placed in an amber bottle and dissolved. The charge transport layer was obtained by coating the diamine solution onto the above azo photogenerating layer using a 5 mil wet gap Bird Film Applicator. The thickness of the transport layer was ~27 μm. The resulting photoconductive imaging member was air dried for 1 hour and vacuum dried for 6 hours or more. The xerographic properties of this device were then evaluated on a flat plate scanner text fixture. The results are summarized as follows:

| | |
|---|---|
| $V_{ddp}$ (Volts) (dark development potential) | −940 |
| Dark Decay (volt/sec) | −30 |
| $E_{0.5ddp}$ at 600 nanometers (erg/cm$^2$) (energy to discharge half of the potential) | 13.6 |
| $E_{0.5ddp}$ at 650 nanometers (erg/cm$^2$) (energy to discharge half of the potential) | 10.8 |

EXAMPLE V

There were prepared other photoconductive imaging members by repeating the procedure of Example IV. The bis photogenerating pigments, that is the photogenerating compounds as represented by FIGS. 2 to 19, were selected for the imaging members. The xerographic properties of these imaging members were then evaluated on a flat plate scanner text fixture. The results are provided in FIG. 21.

Analytical data, melting point data, IR analysis, and percent yield for the compounds represented by FIGS. 2 to 19 were as illustrated in FIG. 20, wherein (dec) represents decomposition temperature, and > indicates no melting at the temperature specified.

Although the invention has been described with reference to specific preferred embodiments, it is not intended to be limited thereto, rather those skilled in the art will recognize variations, and modifications may be made therein which are within the spirit of the present invention and within the scope of the following claims.

What is claimed is:

1. A photoconductive imaging member comprised of a supporting substrate; a photogenerating layer comprised of a bisazo compound of the formula

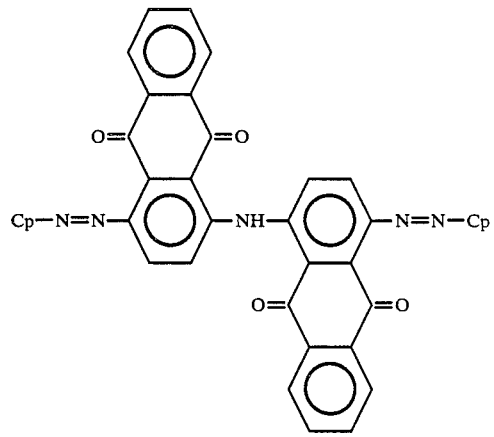

wherein Cp is an azoic coupler selected from the group consisting of

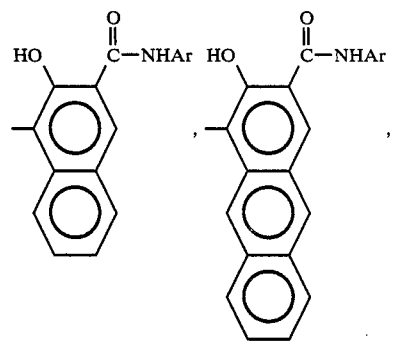

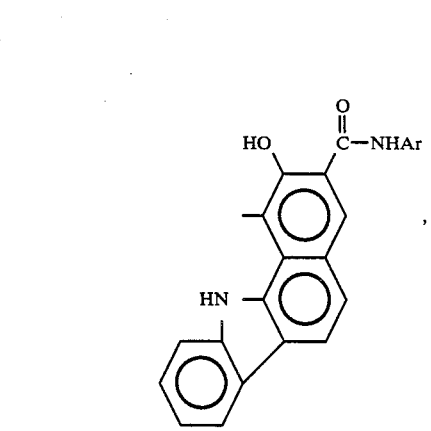

-continued

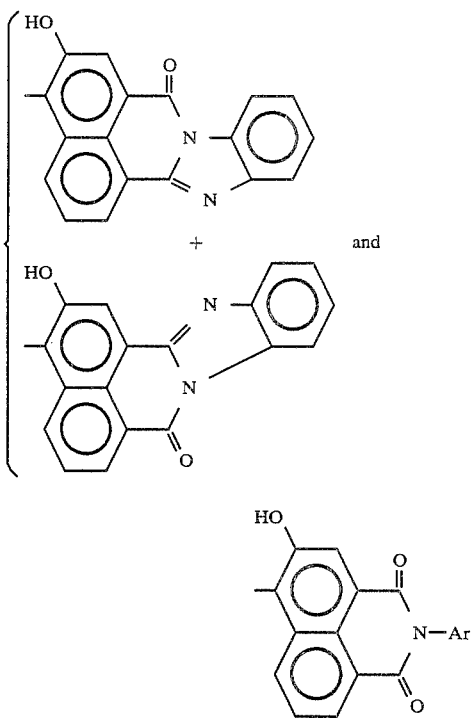

wherein Ar is an aromatic substitutent; and a charge transport layer.

2. A photoconductive member in accordance with claim 1 wherein the aromatic substituent contains from 6 to about 24 carbon atoms.

3. An imaging member in accordance with claim 1 wherein the aromatic substituent is phenyl.

4. An imaging member in accordance with claim 1 wherein the aromatic substituent is substituted with alkyl, alkoxy, halo, trihalomethyl, or nitro.

5. An imaging member in accordance with claim 4 wherein the alkyl substituent contains from 1 to about 20 carbon atoms.

6. An imaging member in accordance with claim 4 wherein the alkyl substituent is methyl.

7. An imaging member in accordance with claim 4 wherein the alkoxy substituent contains from 1 to about 15 carbon atoms.

8. An imaging member in accordance with claim 4 wherein the alkoxy is methoxy.

9. An imaging member in accordance with claim 4 wherein the halo is fluoride, bromide, iodide, or chloride.

10. An imaging member in accordance with claim 1 wherein the bisazo compound is represented by the formulas of FIGS. 1 to 19, respectively.

11. An imaging member in accordance with claim 1 wherein the azo compound is 4,4'-bis(1''-azo-2''-hydroxy-3''-naphthanilide)-1,1'-dianthraquinonylamine; 4,4'-bis(1''-azo-2''-hydroxy-3''-naphtho-p-fluoroanilide)-1,1'-dianthraquinonylamine; 4,4'-bis(1''-azo-2''-hydroxy-3''-naphtho-p-trifluoromethylanilide)-1,1'-dianthraquinonylamine; 4,4'-bis(1''-azo-2''-hydroxy-3''-naphtho-p-methoxyanilide)-1,1'-dianthraquinonylamine; 4,4'-bis(1''-azo-2''-hydroxy-3''-naphtho-p-ethylanilide)-1,1'-dianthraquinonylamine; or 4,4'-bis(1''-azo-2''-hydroxy-3''-naphtho-p-chloroanilide)-1,1'-dianthraquinonylamine.

12. An imaging member in accordance with claim 1 wherein the bisazo photogenerating layer is situated between the supporting substrate and the hole transport layer.

13. An imaging member in accordance with claim 1 wherein the aryl amine hole transport layer is situated between the supporting substrate and the azo photogenerating layer.

14. An imaging member in accordance with claim 1 wherein the supporting substrate is aluminum.

15. An imaging member in accordance with claim 1 wherein the supporting substrate is an organic polymeric composition.

16. An imaging member in accordance with claim 1 wherein the azo photogenerating compound is dispersed in a resinous binder in an amount of from about 5 percent by weight to about 95 percent by weight.

17. An imaging member in accordance with claim 16 wherein the resinous binder is a polyester, polyvinyl butyral, a polycarbonate, or polyvinyl formal.

18. An imaging member in accordance with claim 1 wherein the charge transport layer comprises molecules of the formula

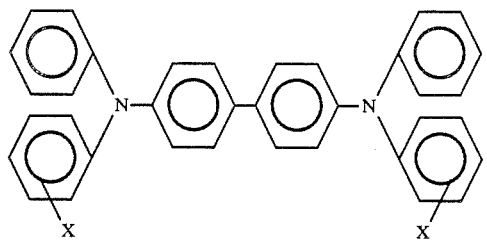

dispersed in a highly insulating and transparent organic resinous binder wherein X is selected from the group consisting of alkyl and halogen.

19. An improved imaging member in accordance with claim 18 wherein X is selected from the group consisting of ortho ($CH_3$), meta ($CH_3$), para ($CH_3$), ortho (Cl), meta (Cl), or para (Cl).

20. An imaging member comprised of (1) a supporting substrate; (2) a hole blocking layer; (3) a photogenerating layer comprised of the bisazo compounds of claim 1; and (4) an aryl amine hole transport layer.

21. An imaging member in accordance with claim 20 wherein there is included between the hole blocking layer and the azo photogenerating layer an adhesive layer.

22. An imaging member in accordance with claim 20 wherein the hole blocking layer is a metal oxide.

23. An imaging member in accordance with claim 20 wherein the hole blocking layer is a siloxane.

24. An imaging member in accordance with claim 20 wherein the charge transport aryl amine layer comprises molecules of the formula

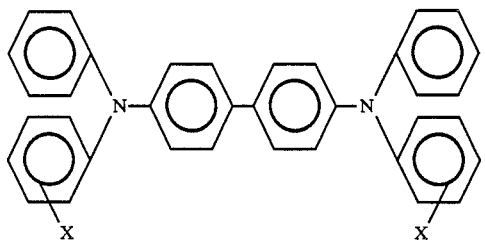

wherein X is selected from the group consisting of alkyl and halogen.

25. An imaging member in accordance with claim 24 wherein the bisazo photogenerating layer is comprised of the compounds selected from the group consisting of those represented by the formulas of FIGS. 1 to 19, respectively.

26. An imaging member in accordance with claim 20 wherein the supporting substrate is aluminum or an organic polymeric composition.

27. A method of imaging which comprises generating an electrostatic image on the imaging member of claim 1; accomplishing development thereof; subsequently transferring this image to a suitable substrate; and thereafter permanently affixing the image thereto.

28. A method of imaging in accordance with claim 27 wherein the imaging member contains a photogenerating layer represented by those compounds as illustrated by the formulas of FIGS. 1 to 19, respectively.

29. A method of imaging in accordance with claim 27 wherein the imaging member has sensitivity of from about 400 to about 750 nanometers.

30. A method of imaging which comprises generating an image in a light emitting diode printer; accomplishing development thereof with a developer composition comprised of resin particles and pigment particles; subsequently transferring the developed image to a suitable substrate; and thereafter permanently affixing the image thereto.

31. A method of imaging in accordance with claim 30 wherein the diode emits light at about 660 nanometers.

32. A photoconductive imaging member comprised of a photogenerating layer comprised of a bisazo compound of the formula

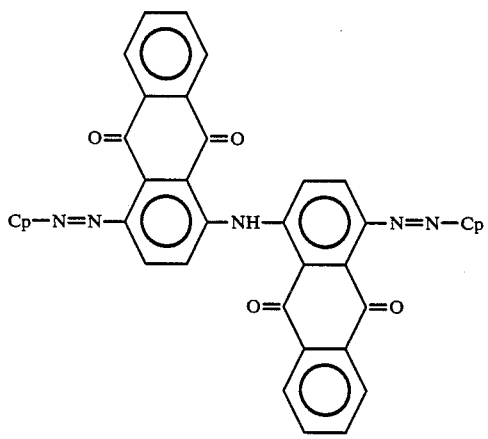

wherein Cp is an azoic coupler selected from the group consisting of

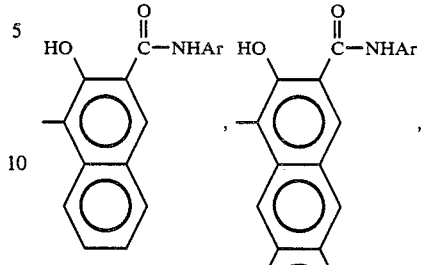

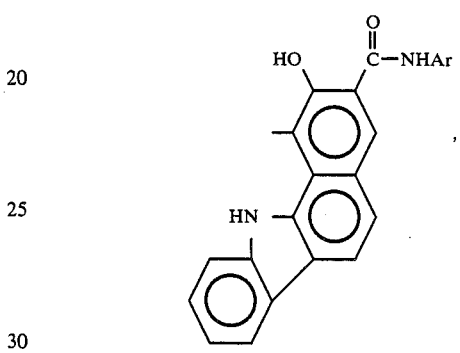

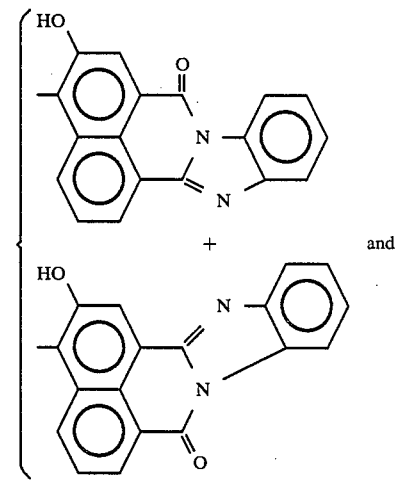

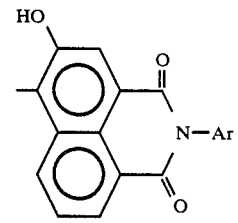

wherein Ar is an aromatic substitutent; and a charge transport layer.

33. An imaging member comprised of (1) a hole blocking layer; (2) a photogenerating layer comprised of the bisazo compounds of claim 1; and (3) an aryl amine hole transport layer.

* * * * *